US012655310B2

(12) United States Patent (10) Patent No.: US 12,655,310 B2
Li et al. (45) Date of Patent: Jun. 16, 2026

(54) EXPANDED COATING, PREPARATION METHOD AND USE THEREOF, AND PERMANENT MAGNET COMPRISING SAME

(71) Applicant: YANTAI ZHENGHAI MAGNETIC MATERIAL CO., LTD., Yantai (CN)

(72) Inventors: Zhiqiang Li, Yantai (CN); Wen Li, Yantai (CN); Pengfei Wang, Yantai (CN); Bin Zhou, Yantai (CN); Yunting Su, Yantai (CN)

(73) Assignee: YANTAI ZHENGHAI MAGNETIC MATERIAL CO., LTD., Yantai (CN)

( * ) Notice: Subject to any disclaimer, the term of this patent is extended or adjusted under 35 U.S.C. 154(b) by 258 days.

(21) Appl. No.: 18/474,942

(22) Filed: Sep. 26, 2023

(65) Prior Publication Data

US 2024/0101836 A1     Mar. 28, 2024

(30) Foreign Application Priority Data

Sep. 27, 2022   (CN) .......................... 202211185592.X

(51) Int. Cl.
C09D 7/40          (2018.01)
C09D 7/61          (2018.01)
               (Continued)

(52) U.S. Cl.
CPC ................ C09D 7/70 (2018.01); C09D 7/61 (2018.01); C09D 7/63 (2018.01); C09D 7/65 (2018.01);
               (Continued)

(58) Field of Classification Search
CPC . C08K 3/013; C08K 5/23; C08K 5/24; C08K 7/22; C09D 163/00; C09D 5/00;
               (Continued)

(56) References Cited

U.S. PATENT DOCUMENTS

2021/0138501 A1     5/2021   Shaghaghi et al.

FOREIGN PATENT DOCUMENTS

CN          102177013 A      9/2011
CN          112774959 A      5/2021
               (Continued)

OTHER PUBLICATIONS

Translation of CN113881294A, Peng et al., Jan. 4, 2022. (Year: 2022).*

*Primary Examiner* — Hai Vo
(74) *Attorney, Agent, or Firm* — NKL Law; Allen Xue

(57)               ABSTRACT
The present disclosure provides an expanded coating, a preparation method and use thereof, and a permanent magnet comprising same. The expanded coating described herein comprises pores and a filler resin arranged among the pores; the pores comprise at least a spheroid pore having a cross section with a long diameter and a short diameter; in the cross section of the expanded coating, the area of the spheroid pores accounts for 50%-60% of the cross-sectional area of the expanded coating. The permanent magnet of the present disclosure comprises the expanded coating. The expanded coating has high strength and can exhibit excellent mechanical properties and corrosion resistance at high temperatures (such as 170° C.), with a shear strength greater than 2 MPa, a tensile strength greater than 2 MPa, an oil resistance greater than 1800 h and a neutral salt spray performance greater than 288 h at 170° C.

15 Claims, 1 Drawing Sheet

(51) Int. Cl.

| | |
|---|---|
| *C09D 7/63* | (2018.01) |
| *C09D 7/65* | (2018.01) |
| *C09D 163/00* | (2006.01) |
| *H01F 1/06* | (2006.01) |
| *H02K 1/02* | (2006.01) |

(52) U.S. Cl.
CPC ............. *C09D 163/00* (2013.01); *H01F 1/06* (2013.01); *H02K 1/02* (2013.01)

(58) Field of Classification Search
CPC ... C09D 7/61; C09D 7/63; C09D 7/65; C09D 7/69; C09D 7/70; H01F 1/06; H02K 1/02
See application file for complete search history.

(56) References Cited

FOREIGN PATENT DOCUMENTS

| | | | | |
|---|---|---|---|---|
| CN | 113150366 A | 7/2021 | | |
| CN | 113593817 A | 11/2021 | | |
| CN | 113764150 A | 12/2021 | | |
| CN | 113881294 A * | 1/2022 | ............... | C09D 7/63 |
| EP | 3819922 A1 | 5/2021 | | |
| JP | 2007313475 A | 12/2007 | | |
| JP | 2015004481 A | 1/2015 | | |
| WO | 2014086966 A2 | 6/2014 | | |

* cited by examiner

EXPANDED COATING, PREPARATION METHOD AND USE THEREOF, AND PERMANENT MAGNET COMPRISING SAME

CROSS-REFERENCE TO RELATED APPLICATIONS

The present application claims priority to Chinese Patent Application No. 202211185592.X filed with China National Intellectual Property Administration on Sep. 27, 2022, entitled "EXPANDED COATING, PREPARATION METHOD AND USE THEREOF, AND PERMANENT MAGNET COMPRISING SAME", the content of which is incorporated herein by reference in its entirety.

TECHNICAL FIELD

The present disclosure relates to an expandable coating, a preparation method and use thereof, and a permanent magnet comprising same, and particularly, to a permanent magnet comprising an expandable coating with a specific microstructure, a preparation method and use thereof.

BACKGROUND

With the rapid advancement of the new energy automobile industry, rare earth permanent magnet synchronous motors are widely applied due to their advantages of low loss, high efficiency, significant power saving effect and the like. Meanwhile, since the magnetic steel assembly process of the rare earth permanent magnet synchronous motors is one of the main production processes of motors, problems such as contamination, convenience, assembly precision and the like gradually became concerns of automobile manufacturers.

In recent years, in addition to the current mainstream processes of injection molding and glue injection, expandable coatings have been gradually applied to the magnetic steel assembly process due to its advantages of safety, environmental conservation, ease to operate, high assembly precision and the like. The expandable coatings can be expanded by thermal treatment to fill a magnetic steel groove, thus fixing the magnetic steel pieces.

The Patent Publication No. CN112774959A discloses a process for applying an expandable powder on a magnet, and the expandable powder comprises a prepolymer, a curing agent, at least one functional filler, and a foaming agent, wherein the foaming agent is a chemical foaming agent. The foaming agent does not prematurely react with the substrate of the coating, thereby allowing the magnet coated with the coating to maintain structural stability in the process of shipping and storage.

The Patent Publication No. CN113593817A discloses a method for manufacturing a magnet preform and a magnet assembly. The preform comprises a magnet and an expandable coating on the surface thereof, wherein the expandable coating comprises ammonium polyphosphate, a polyol, an epoxy resin, carbodiimide, N-hydroxysuccinimide, and the like. The expanded coating has relatively a high magnet-substrate binding force and neutral salt spray test performance at room temperature after expansion.

However, the highest temperature of an automobile motor in operation may exceed 150° C. If the expanded coating has relatively poor thermal stability, the product may be sheared along the magnetic steel groove under the action of centrifugal force, thus damaging the coating. Therefore, the mechanical performance and corrosion resistance of the expanded coating at high temperatures (>150° C.) still need to be further improved.

SUMMARY

In order to solve the technical problems described above, the present disclosure provides the following technical schemes:

The present disclosure provides an expanded coating comprising pores and a filler resin arranged among the pores, wherein the pores comprise at least a spheroid pore having a cross section with a long diameter and a short diameter. According to the present disclosure, the cross section of the spheroid pore refers to any cross section passing through a central point of the pore, wherein the long diameter, denoted as R1, is the longest distance passing through the central point on a quasi-circular cross section, and the short diameter, denoted as R2, is the shortest distance passing through the center point on the quasi-circular cross section.

According to an embodiment of the present disclosure, in a cross section of the expanded coating, the area of the spheroid pores accounts for 50%-60%, preferably 53%-57%, such as 56%, 57%, 60%, 68% or 70%, of the cross-sectional area of the expandable coating.

According to an embodiment of the present disclosure, the cross section of the spheroid pores can have a shape substantially as shown in FIG. 1.

According to an embodiment of the present disclosure, the long diameter and the short diameter are preferably perpendicular.

According to an embodiment of the present disclosure, the ratio of the short diameter to the long diameter is denoted as R2/R1. Based on the total amount of the spheroid pores, the percentage proportion of spheroid pores having a ratio of $0.7 < R2/R1 \leq 1$ can be selected from 60%-80%, preferably 70%-78%, such as 65%, 68%, 72%, 74% or 77%.

Moreover, the percentage proportion of the spheroid pores having a ratio of $R2/R1 \leq 0.5$ can be less than 8%, preferably less than or equal to 5%, such as 2%, 3%, 4%, 5%, 6% or 7%.

Preferably, the percentage proportion of spheroid pores having a ratio of $0.8 < R2/R1 \leq 1$ can be 40%-55%, preferably 50%-53%, such as 33%, 47%, 48%, 52% or 55%. Furthermore, the percentage proportion of spheroid pores having a ratio of $0.9 < R2/R1 \leq 1$ can be 25%-30%, preferably 26%-28%, such as 25%, 28%, 29% or 30%.

According to an embodiment of the present disclosure, based on the total amount of the spheroid pores:

the percentage proportion of spheroid pores having a diameter of R1>60 μm can be less than 12%, preferably less than or equal to 10%, such as 7%, 8%, 9% or 10%;

the percentage proportion of spheroid pores having a diameter of 30 μm<R1≤50 μm can be 50%-60%, preferably 55%-60%, such as 50%, 53%, 54%, 55% or 59%;

the percentage proportion of spheroid pores having a diameter of 20 μm<R1≤30 μm can be 15%-20%, preferably 16%-20%, such as 16%, 17%, 18% or 19%;

the percentage proportion of spheroid pores having a diameter of R1≤20 μm can be less than 10%, preferably less than 7%, such as 0%, 4%, 5% or 6%.

Preferably, the percentage proportion of spheroid pores having a diameter of R1>80 μm can be less than 5%, preferably less than 3%, such as 0%, 1%, 2% or 3%.

According to an embodiment of the present disclosure, the filler resin is provided by a thermosetting resin.

According to an embodiment of the present disclosure, the expanded coating has a neutral salt spray performance greater than 288 h, such as 312 h, 336 h or 360 h.

According to an embodiment of the present disclosure, the expanded coating has an oil resistance greater than 1800 h at 170° C., such as 1920 h, 2016 h or 2112 h.

According to an embodiment of the present disclosure, the expanded coating has a shear strength greater than 2 MPa at 170° C., such as 2.1 MPa, 2.3 MPa or 2.5 MPa.

According to an embodiment of the present disclosure, the expanded coating has a tensile strength greater than 2 MPa at 170° C., such as 2.1 MPa, 2.2 MPa or 2.3 MPa.

The present disclosure further provides a preparation method of the above expanded coating, comprising applying a coating on a surface of a magnet substrate, pre-curing the coating, and expanding and curing the coating to obtain the expanded coating.

According to an embodiment of the present disclosure, the coating is provided by an expandable coating material.

According to an embodiment of the present disclosure, based on the part by weight, the expandable coating material comprises at least 50-80 parts of a thermosetting resin, 5-20 parts of an expandable microsphere, 0.2-1.5 parts of a chemical foaming agent, 0.3-2 parts of a curing agent, and 15-30 parts of a pigment and filler.

Preferably, based on the part by weight, the expandable coating material comprises 60-70 parts of the thermosetting resin, 8-15 parts of the expandable microsphere, 0.5-1.5 parts of the chemical foaming agent, 0.8-1.5 parts of the curing agent, and 17-25 parts of the pigment and filler.

According to an embodiment of the present disclosure, the amount ratio of the expandable microsphere to the chemical foaming agent is (5-20):(0.1-1.5), preferably (10-18):(0.3-1.1), such as 10:0.3, 10:0.8, 16:0.9 or 18:1.

According to an embodiment of the present disclosure, the thermosetting resin can be at least one selected from bisphenol A-based epoxy resins, preferably a bisphenol A-based epoxy resin with a softening point between 50° C. to 95° C.

According to an embodiment of the present disclosure, the expandable microsphere is selected from an expandable microsphere with an average particle size of 5-50 μm, preferably 5-20 μm, more preferably 10-15 μm. For example, the expandable microsphere is at least one selected from 920DU80, 920DU40 and 920DU20 in the Expancel series from AKZO-Nobel. For example, the expandable microsphere is selected from a mixture of 920DU40 and 920DU20 in a weight ratio of (1-10):(1-10).

According to an embodiment of the present disclosure, the chemical foaming agent is at least one selected from azodicarbonamide, azobisisobutyronitrile, and p-toluene-sulfonyl hydrazide, such as azodicarbonamide.

According to an embodiment of the present disclosure, the curing agent is at least one selected from latent amine curing agents.

Preferably, the latent amine curing agent is at least one selected from imidazole, an epoxy resin adduct of imidazole, and an epoxy resin adduct of polyamine, such as dicyandiamide.

According to an embodiment of the present disclosure, the pigment and filler is at least one selected from insulating carbon black, mica powder, calcium carbonate, and a nano-aluminosilicate fiber, such as insulating carbon black.

According to an embodiment of the present disclosure, the applying a coating comprises coating the expandable coating material on the surface of the magnet substrate to form the coating. Preferably, said applying a coating can be performed by a coating method known in the art, such as electrostatic spraying.

According to an embodiment of the present disclosure, the pre-curing can be performed under a temperature selected from 90-130° C., preferably 95° C. to 110° C., such as 95° C., 100° C., 105° C. or 110° C. Moreover, the pre-curing can be performed for 5-20 min, preferably 8-18 min, such as 8 min, 10 min, 12 min, 14 min, 16 min or 18 min.

According to an embodiment of the present disclosure, after the pre-curing, the coating has a thickness of 50-200 μm, preferably 80-150 μm, such as 80 μm, 90 μm, 100 μm, 110 μm, 120 μm, 130 μm, 140 μm or 150 μm.

According to an embodiment of the present disclosure, said expanding and curing comprise: subjecting the magnet substrate to thermal curing in a groove to obtain the expanded coating.

Preferably, the thermal curing can be performed under a temperature selected from 190° C. to 230° C., preferably 200° C. to 220° C., such as 200° C., 205° C., 210° C., 215° C. or 220° C.

Preferably, the thermal curing can be performed for 15-40 min, preferably 20-30 min, such as 20 min, 25 min or 30 min.

for example, the groove is preferably arranged on a rotor.

The present disclosure further provides an expanded coating prepared by the preparation method described above, wherein the expanded coating having the meaning as described above.

The present disclosure further provides use of the expanded coating described above, preferably in a permanent magnet.

The present disclosure further provides a permanent magnet, comprising the expanded coating and a magnet substrate, wherein the expanded coating is located on a surface of the magnet substrate.

According to an embodiment of the present disclosure, the magnet substrate may be a magnet substrate known in the art, as long as the permanent magnet can be acquired.

For example, the magnet substrate has a shape selected from a cube.

According to an embodiment of the present disclosure, the expanded coating is prepared by the preparation method described above.

The present disclosure further provides an use of the permanent magnet described above, preferably in a rotor.

Advantageous Effects

1. The permanent magnet of the present disclosure comprises an expanded coating; the pores in the expanded coating are relatively consistent in size, and comprise spheroid pores with a special shape without through pores, and a filler resin among the pores. The expanded coating of the present disclosure has high strength and can exhibit excellent mechanical properties and corrosion resistance at high temperatures (such as 170° C.), with a shear strength greater than 2 MPa, a tensile strength greater than 2 MPa, an oil resistance greater than 1800 h and a neutral salt spray performance greater than 288 h at 170° C.

2. In the present disclosure, a chemical foaming agent and a physical foaming agent (the expandable microsphere) are combined in a specific ratio to improves the expansion rate of the coating which combining the stability of the expandable microsphere and the flexibility of the chemical foaming agent. The chemical foaming agent has the features of good controllability, relatively uniform expansion, and high supporting force, so the chemical foaming agent can achieve a higher expansion rate. By combination of the chemical foaming agent and the physical foaming agent, the coating after expansion has a high expansion rate, stable coating structure, and also has high strength, lower weight, good adhesion, resistance to delamination, splitting and impact, and strong supporting force.

3. By combining the chemical foaming agent with the physical foaming agent (the expandable microsphere) according to a specific ratio, the present disclosure achieves a better foaming effect while reducing environmental problems caused by the chemical foaming agent. Also, the quick reaction of the chemical foaming agent results in difficulties in accurately controlling the expansion ratio, thus leading to relatively high requirements for foaming gaps. When the amount of the chemical foaming agent is excessive, the microsphere may even be penetrated, resulting in poor stability, thrust and adhesive force, and the like, and thus low binding force and easy peeling-off of the coating.

DETAILED DESCRIPTION

Figure 1:
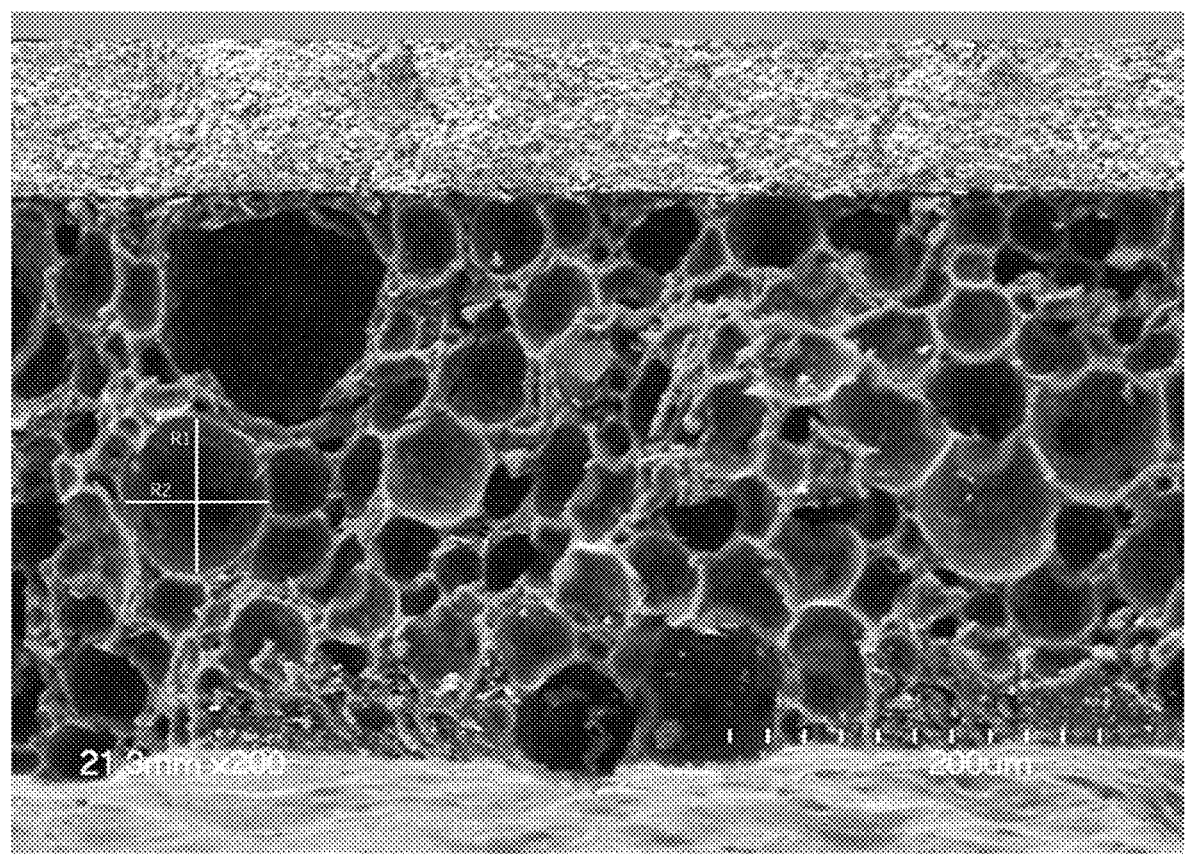
FIG. 1 is a diagram illustrating the cross-sectional microstructure of the expanded coating after expansion;
in the diagram, R1 is a long diameter of pores, and R2 is a short diameter of the pores.
Figure 2:
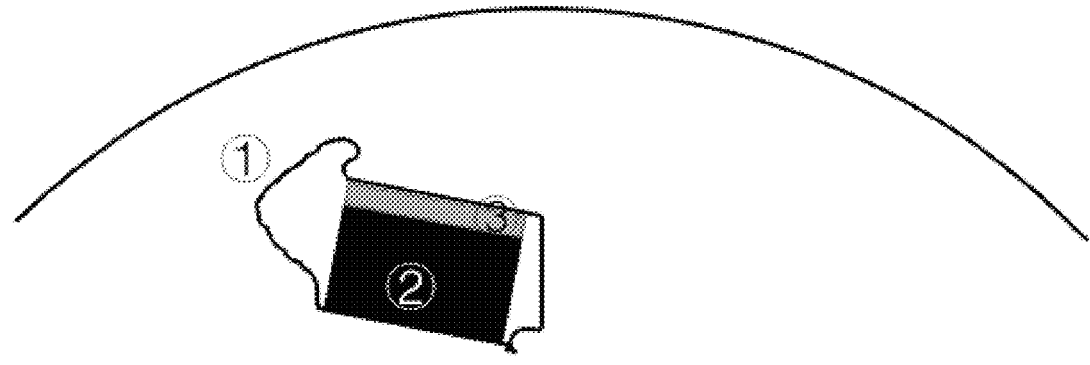
FIG. 2 is a schematic diagram of a permanent magnet coated with the expanded coating fixed in a magnet steel groove of a rotor;
in the diagram, ①: magnetic steel groove hole of iron-core rotor; ②: magnet substrate; ③: expanded coating.

The embodiments of the present disclosure will be further illustrated in detail with reference to the following specific examples. It will be appreciated that the following examples are merely exemplary illustrations and explanations of the present disclosure, and should not be construed as limiting the protection scope of the present disclosure. All techniques implemented based on the content of the present disclosure described above are included within the protection scope of the present disclosure. Unless otherwise stated, the starting materials and reagents used in the following examples are all commercially available products or can be prepared using known methods.

In the following examples and comparative examples, a cubic neodymium-iron-boron product with dimensions of 20 mm×10 mm×3.5 mm is used as the magnet substrate.

Example 1

The preparation method of the permanent magnet are as follows:
1) Preparation of coating: An expandable coating material was applied to the surface of a magnet substrate by electrostatic spraying. The expandable coating material consisted of components in the following weight proportions: 68% of an epoxy resin, 4% of expandable microsphere Expancel® 920DU40 and 6% of 920DU20, 0.8% of azodicarbonamide, 1.2% of curing agent dicyandiamide (Aladdin, 98%), and 20% of pigment and filler insulating carbon black (Tianjin Ebory Chemical Co., Ltd.). The material was pre-cured at 90° C. for 20 min to form a film, with a coating thickness of 100 μm, so as to give a permanent magnet coated with the coating on the surface.
2) Foaming and expanding treatment: The permanent magnet obtained in step 1) was placed in an oven as a magnetic steel piece, and subjected to curing at 210° C. for 30 min to give a permanent magnet comprising an expanded coating on the surface.

Comparative Example 1

The preparation method of the permanent magnet are substantially the same as those in Example 1, except that the expandable coating material consisted of components in the following weight proportions: 68% of an epoxy resin, 12% of expandable microsphere Expancel® 920DU40 and 14% of 920DU20, 0.8% of azodicarbonamide, 1.2% of curing agent dicyandiamide (Aladdin, 98%), and 4% of pigment and filler insulating carbon black (Tianjin Ebory Chemical Co., Ltd.).

Example 2

The preparation method of the permanent magnet are as follows:
1) Application of coating: An expandable coating material was applied to the surface of a magnet by electrostatic spraying. The expandable coating material consisted of components in the following weight proportions: 56% of an epoxy resin, 8% of expandable microsphere Expancel® 920DU40 and 8% of 920DU20, 0.9% of azodicarbonamide, 0.7% of curing agent dicyandiamide (Aladdin, 98%), and 26.4% of pigment and filler insulating carbon black (Tianjin Ebory Chemical Co., Ltd.). The material was pre-cured at 90° C. for 20 min to form a film, with a coating thickness of 160 μm, so as to give a permanent magnet coated with the coating on the surface.
2) Foaming and expanding treatment: The permanent magnet obtained in step 1) was placed in an oven, and subjected to curing at 230° C. for 40 min to give a permanent magnet comprising an expanded coating on the surface.

Comparative Example 2

The preparation method of the permanent magnet are substantially the same as those in Example 2, except that the expandable coating material consisted of components in the following weight proportions: 56% of an epoxy resin, 12% of expandable microsphere Expancel® 920DU40 and 10% of 920DU20, 1.8% of azodicarbonamide, and 20.2% of pigment and filler insulating carbon black (Tianjin Ebory Chemical Co., Ltd.).

Example 3

The preparation method of the permanent magnet are as follows:
1) Application of coating: An expandable coating material was applied to the surface of a magnet by electrostatic spraying. The expandable coating material consisted of components in the following weight proportions: 65% of an epoxy resin, 6% of expandable microsphere Expancel® 920DU40 and 3% of 920DU20, 1.2% of azodicarbonamide, 0.8% of curing agent dicyandiamide (Aladdin, 98%), and 24% of pigment and filler insulating carbon black (Tianjin Ebory Chemical Co., Ltd.). The material was pre-cured at 100° C. for 15 min to form a film, with a coating thickness of 100 μm, so as to give a permanent magnet coated with the coating on the surface.

2) Foaming and expanding treatment: The permanent magnet obtained in step 1) was placed in an oven, and subjected to curing at 190° C. for 30 min to give a permanent magnet comprising an expanded coating on the surface.

Comparative Example 3

The preparation method of the permanent magnet are as follows:

1) Application of coating: An expandable coating material was applied to the surface of a magnet by electrostatic spraying. The expandable coating material consisted of components in the following weight proportions: 60% of an epoxy resin, 6% of expandable microsphere Expancel® 920DU40 and 10% of 920DU20, 1.0% of azobisisobutyronitrile, 0.5% of azodicarbonamide, 0.6% of curing agent dicyandiamide (Aladdin, 98%), and 21.9% of pigment and filler insulating carbon black (Tianjin Ebory Chemical Co., Ltd.). The material was pre-cured at 100° C. for 15 min to form a film, with a coating thickness of 100 μm, so as to give a permanent magnet coated with the coating on the surface.

2) Foaming and expanding treatment: The permanent magnet obtained in step 1) was placed in an oven, and subjected to curing at 210° C. for 30 min to give a permanent magnet comprising an expanded coating on the surface.

Example 4

The preparation method of the permanent magnet are as follows:

1) Application of coating: An expandable coating material was applied to the surface of a magnet by electrostatic spraying. The expandable coating material consisted of components in the following weight proportions: 66% of an epoxy resin, 6% of expandable microsphere Expancel® 920DU40 and 8% of 920DU20, 0.8% of azobisisobutyronitrile, 1.2% of curing agent dicyandiamide (Aladdin, 98%), and 18% of pigment and filler insulating carbon black (Tianjin Ebory Chemical Co., Ltd.). The material was pre-cured at 100° C. for 15 min to form a film, with a coating thickness of 100 μm, so as to give a permanent magnet coated with the coating on the surface.

2) Foaming and expanding treatment: The permanent magnet obtained in step 1) was placed in an oven, and subjected to curing at 230° C. for 35 min to give a permanent magnet comprising an expanded coating on the surface.

Data of spheroid pores in the cross section of the expandable coating on the surface of the permanent magnets of the examples and comparative examples are shown in Table 1.

Test Example

The expandable coatings on the surface of the permanent magnets of the examples and comparative examples described above were subjected to the following tests, and test results are shown in Table 2.

(1) The condition of the shear strength test at 170° C. is as follows: at an environmental temperature of 170° C. according to GB/T 7124-2008.

(2) The condition of the tensile strength test at 170° C. is as follows: at an environmental temperature of 170° C. according to GB/T 6329-1996.

(3) Corrosion resistance:

(a) The condition and procedures of the neutral salt spray test (SST) are as follows: a temperature of 35° C.; an aqueous NaCl solution with a concentration of 50 g/L±5 g/L; pH 6.5-7.2; the aqueous NaCl solution was atomized and deposited on a neodymium-iron-boron magnet product to be tested; the time to the appearance of rust on the surface of the magnet was recorded;

(b) The procedures of the oil immersion test are as follows: the neodymium-iron-boron magnet product was completely soaked in a transmission fluid at 150° C.; the corrosion, bubbling, peeling and other situations on the surface of the magnet were observed; the time to such changes of the coating on the surface of the magnet was recorded and the performance of the coating of the magnet was determined again; if the performance was not affected, the time was recorded as the time for oil immersion resistance.

TABLE 1

| | | | | | | | |
|---|---|---|---|---|---|---|---|
| Summary of microstructural data of the spheroid pores in the expanded coatings | | | | | | | |
| | Example 1 | Comparative Example 1 | Example 2 | Comparative Example 2 | Example 3 | Comparative Example 3 | Example 4 |
| 0.9 < R2/R1 ≤ 1 | 28.50% | 18.20% | 29.00% | 15.00% | 28.00% | 25.00% | 20.00% |
| 0.8 < R2/R1 ≤ 1 | 52.00% | 38.00% | 47.00% | 35.00% | 55.00% | 48.00% | 33.00% |
| 0.7 < R2/R1 ≤ 1 | 77.00% | 66.00% | 68.00% | 56.00% | 74.00% | 72.00% | 55.00% |
| R2/R1 ≤ 0.5 | 4.00% | 3.30% | 6.50% | 9.00% | 4.00% | 5.00% | 12.00% |
| R1 < 80 μm | 2.00% | 1.20% | 4.00% | 16.10% | 12.00% | 3.00% | 4.00% |
| R1 < 60 μm | 9.30% | 14.20% | 11.00% | 33.30% | 25.00% | 10.00% | 9.00% |
| 30 μm < R1 ≤ 50 μm | 55.50% | 50.10% | 54.00% | 42.90% | 35.00% | 59.00% | 53.00% |
| 20 μm < R1 ≤ 30 μm | 19.00% | 23.00% | 14.50% | 17.50% | 9.00% | 16.00% | 15.00% |
| R1 ≤ 20 μm | 6.00% | 5.20% | 8.00% | 0.00% | 0.00% | 5.00% | 4.00% |
| Proportion of spheroid pores | 56.50% | 74.00% | 60.00% | 70.00% | 57.00% | 68.00% | 56.00% |

TABLE 2

| | Push-out strength at 170° C./ MPa | Shear strength at 170° C./ MPa | Tensile strength at 170° C./ MPa | SST | Oil immersion |
|---|---|---|---|---|---|
| | Performance test results of the expanded coatings | | | | |
| Example 1 | 3.23 | 2.74 | 2.37 | 336 h | 2112 h |
| Comparative Example 1 | 0.85 | 0.69 | 0.56 | 312 h | 1920 h |
| Example 2 | 3.01 | 2.53 | 2.19 | 336 h | 2112 h |
| Comparative Example 2 | 0.98 | 0.75 | 0.69 | 312 h | 1920 h |
| Example 3 | 2.58 | 2.26 | 1.97 | 336 h | 2112 h |
| Comparative Example 3 | 1.52 | 1.46 | 1.03 | 312 h | 2112 h |
| Example 4 | 2.71 | 2.33 | 2.04 | 336 h | 2112 h |

As seen from the results of Tables 1 and 2:

1. The comparison results of Example 1 with Comparative Example 1 indicate that: the 26:0.8 ratio of the expandable microsphere to the chemical foaming agent, i.e., an increased amount of the microsphere and an excessively low amount of the chemical foaming agent, resulted in an increased total amount of the expanding agent along with an excessive expansion rate; the proportion of pores in the coating reached 74%, which resulted in loose pore gaps in the expandable coating, excessive pore gaps, and poor stability, thrust, adhesive force and the like, thereby further causing low binding force and ease to peeling off the coating.

2. The comparison results of Example 2 with Comparative Example 2 indicate that: the 22:1.8 ratio of the expandable microsphere to the chemical foaming agent used in Example 2, excessive amounts of both the microsphere and the chemical foaming agent exceeding the range resulted in a proportion of the spheroid pores in the coating reaching 70% after expansion, which also led to the problems of an excessive expansion rate, loose pore gaps in the expandable coating, excessive pore gaps, and poor stability. The permanent magnet of Example 2 exhibited a higher shear strength than Comparative Example 2, significantly higher shear and tensile strengths than Comparative Example 2, and superior corrosion resistance at 170° C.

3. The comparison results of Example 3 with Comparative Example 3 indicate that: Although both ratios of the expandable microsphere to the chemical foaming agent in Example 3 and Comparative Example 3 were in the range of (5-20):(0.1-1.5), the proportion of the spheroid pores in the coating of the product of Comparative Example 3 reached 68% (higher than 60%), which also led to poor stability and significantly higher shear and tensile strengths than those of Example 3, due to an excessive expansion rate, loosen pore gaps in the expandable coating, and large pore gaps.

4. The comparison results of Example 3 with Comparative Example 2 indicate that the permanent magnet of Example 3 had a higher shear strength than Comparative Example 2, a significantly higher tensile strength than Comparative Example 2, and a superior corrosion resistance to Comparative Example 2 at 170° C. It can be seen that although the proportion of pores with a long diameter of 30 $\mu$m<R1≤50 $\mu$m in Example 3 was 35% (not in the range of 50-60%), the ratio of R2/R1 was less than 8% and the proportion of the spheroid pores in the coating was 50-60%, such that the expandable coating of the permanent magnet of Example 3 had relatively better shear strength and tensile strength.

5. The comparison results of Example 4 with Example 1 indicate that since the percentage proportion of spheroid pores having a ratio of 0.8<R2/R1≤1 in the expandable coating of the permanent magnet of Example 4 was 33% (not in the range of 40-55%), the expandable coating of the permanent magnet of Example 4 had relatively worse shear strength and tensile strength than those of Example 1.

6. The comparison results of Example 3 with Comparative Example 3 indicate that: although both amount ratios of the expandable microsphere to the chemical foaming agent in Example 3 and Comparative Example 3 were in the range of (5-20):(0.1-1.5), the area of the spheroid pores in the coating of the product of Comparative Example 3 accounted for 68% of the cross-sectional area of the expandable coating (exceeding the range of 50% to 60%), such that the product of Comparative Example 3 had slightly lower shear and tensile strengths than those of Example 3 at 170° C.

7. The comparison results of Example 1 with Example 2 indicate that when the ratio of R2/R1 was less than 8%, and R1 value and the proportion of the pores in the coating were both in preferred ranges, the expandable coating of the permanent magnet of Example 1 exhibited slightly higher shear and tensile strengths and equivalent corrosion resistance at 170° C.

8. The comparison results of the examples with the comparative examples indicate that, for the performances of the permanent magnet in shear and tensile strengths and corrosion resistance at 170° C., a microstructure of the expandable coating affects the above performances of the permanent magnet in the following order: the proportion of the spheroid pores>the range of R1 value>the range of ratio R2/R1.

The exemplary embodiments of the present disclosure have been described above. However, the protection scope of the present application is not limited to the above embodiments. Any modification, equivalent, improvement, and the like made by those skilled in the art without departing from the spirit and principle of the present disclosure shall fall within the protection scope of the present disclosure.

The invention claimed is:

1. An expanded coating, comprising spheroid pores and a filler resin arranged among the pores, wherein:

the filler resin is a thermosetting resin;

each spheroid pore has a cross section with a long diameter (R2) and a short diameter (R1), based on the total amount of the spheroid pores, a percentage of spheroid pores having a ratio of 0.7<R2/R1≤1 is 60%-80%, a percentage of the spheroid pores having a ratio of R2/R1≤0.5 is less than 8%, a percentage of spheroid pores having a ratio of 0.9<R2/R1≤1 is 25%-30%, a percentage of spheroid pores having 20 $\mu$m<R1≤30 $\mu$m is 15%-20%, and a percentage of spheroid pores having R1>80 $\mu$m is less than 5%;

a sum of cross-sectional areas of the spheroid pores in a cross section of the expanded coating accounts for 50%-60% of the cross-sectional area of the expanded coating;

for each spheroid pore, a cross section of the spheroid pore is a quasi-cross section that passes through a central point of the spheroid pore, the long diameter is the longest distance passing through the central point on the quasi-circular cross section and the short diameter is the shortest distance passing through the center point on the quasi-circular cross section;

wherein the expanded coating is prepared by heating a raw material mixture comprising, by parts by weight, 60-80 parts of the thermosetting resin, 5-20 parts of an expandable microsphere, 0.2-1.5 parts of a chemical foaming agent, 0.3-1.5 parts of a curing agent, and 15-30 parts of a pigment and filler;

the amount ratio of the expandable microsphere to the chemical foaming agent is (5-20):(0.1-1.5);

the thermosetting resin is at least one selected from bisphenol A-based epoxy resins; the expandable microsphere is selected from an expandable microsphere with an average particle size of 5-50 μm;

the chemical foaming agent is at least one selected from azodicarbonamide, azobisisobutyronitrile, and p-toluenesulfonyl hydrazide;

the curing agent is at least one selected from imidazole, an epoxy resin adduct of imidazole, and an epoxy resin adduct of polyamine;

the pigment and filler is at least one selected from insulating carbon black, mica powder, calcium carbonate, and a nano-aluminosilicate fiber.

2. The expanded coating according to claim 1, wherein the sum of cross-sectional areas of the spheroid pores accounts for 53%-57% of the cross-sectional area of the expanded coating; and based on the total amount of the spheroid pores, the percentage of spheroid pores having a ratio of $0.7 < R2/R1 \leq 1$ is 70%-78%;

the percentage of the spheroid pores having a ratio of $R2/R1 \leq 0.5$ is less than 5%; and the percentage of spheroid pores having a ratio of $0.9 < R2/R1 \leq 1$ is 26%-28%.

3. The expanded coating according to claim 1, wherein based on the total amount of the spheroid pores:

the percentage of spheroid pores having $20 \, \mu m < R1 \leq 30 \, \mu m$ is 16%-20%; and the percentage of spheroid pores having $R1 \leq 20 \, \mu m$ is less than 10%.

4. The expanded coating according to claim 1, wherein the expanded coating has a neutral salt spray performance greater than 288 h;

the expanded coating has an oil resistance greater than 1800 h at 170° C.;

the expanded coating has a shear strength greater than 2 MPa at 170° C.; and the expanded coating has a tensile strength greater than 2 MPa at 170° C.

5. A rotor comprising the expanded coating according to claim 1, wherein the expanded coating is attached to a permanent magnet.

6. A permanent magnet, comprising the expandable coating according to claim 1 and a magnet substrate, wherein the expandable coating is located on a surface of the magnet substrate.

7. A rotor comprising the permanent magnet according to claim 6.

8. The expanded coating according to claim 1, wherein based on the total amount of the spheroid pores, the percentage of spheroid pores having $R1 > 80 \, \mu m$ is less than 3%.

9. The expanded coating according to claim 1, wherein the percentage of spheroid pores having a ratio of $0.8 < R2/R1 \leq 1$ is 40%-55%;

the percentage proportion of spheroid pores having $R1 > 60 \, \mu m$ is less than 12%;

the percentage proportion of spheroid pores having $30 \, \mu m < R1 \leq 50 \, \mu m$ is 50%-60%; and the percentage proportion of spheroid pores having $R1 > 80 \, \mu m$ is less than 3%.

10. The expanded coating according to claim 1, wherein based on the total amount of the spheroid pores:

the percentage of spheroid pores having $R1 > 60 \, \mu m$ is less than or equal to 10%;

the percentage of spheroid pores having $30 \, \mu m < R1 \leq 50 \, \mu m$ is 55%-60%;

the percentage of spheroid pores having a ratio of $0.8 < R2/R1 \leq 1$ is 50%-53%; and the percentage of spheroid pores having $R1 \leq 20 \, \mu m$ is less than 7%.

11. The expanded coating according to claim 1, wherein, based on parts by weight, the raw material mixture comprises 60-70 parts of the thermosetting resin, 8-15 parts of the expandable microsphere, 0.5-1.5 parts of the chemical foaming agent, 0.8-1.5 parts of the curing agent, and 17-25 parts of the pigment and filler.

12. The expanded coating according to claim 1, wherein a ratio of the expandable microsphere to the chemical foaming agent is (10-18):(0.3-1.1).

13. The expanded coating according to claim 1, wherein the bisphenol A-based epoxy resins has a softening point between 50° C. to 95° C.

14. The expanded coating according to claim 1, wherein the expandable microsphere is selected from an expandable microsphere with an average particle size of 5-20 μm.

15. The expanded coating according to claim 1, wherein the expandable microsphere is selected from an expandable microsphere with an average particle size of 10-15 μm.

* * * * *